INVENTOR
JOHN C. RICE
BY
ATTORNEYS

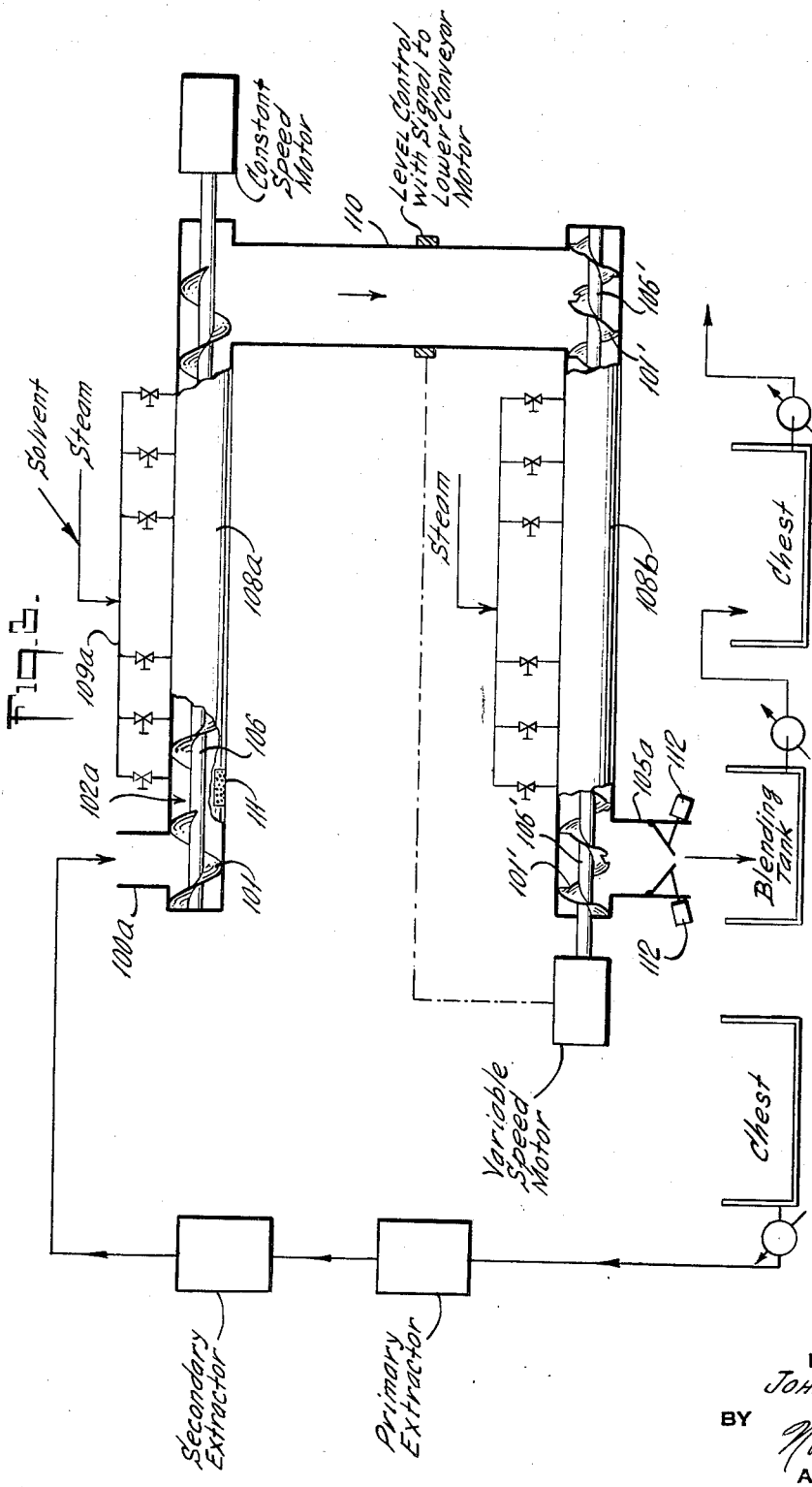

United States Patent Office 3,507,742
Patented Apr. 21, 1970

3,507,742
PROCESS FOR DISPERSING CONTAMINANTS IN WASTE PAPER WITH ORGANIC SOLVENT VAPORS
John C. Rice, Tenafly, N.J., assignor to Lowe Paper Company, Ridgefield, N.J., a corporation of New Jersey
Filed May 18, 1966, Ser. No. 551,042
Int. Cl. D21c 5/02, 5/00
U.S. Cl. 162—5                                                          5 Claims

ABSTRACT OF THE DISCLOSURE

A process for dispersing contaminants in paper stock comprising the step of pressing a wet pulp paper mass to a solids content of at least 12% and exposing said moisture-reduced mass to vapors of at least one solvent for said contaminant at 120 to 250° F. whereby the contaminants are softened and dispersed.

---

Figure 1:
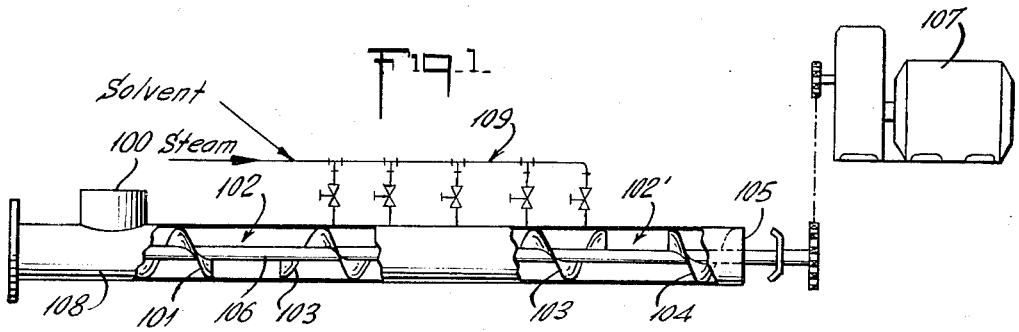

The present invention relates to a process of dispersing contaminants in waste paper stock. Waste paper stock usually contains bituminous contaminants such as asphalt as well as wax, oil, plastics and certain inks and pressure sensitive adhesives. More specifically, the present invention relates to a process of rendering the contaminants ineffectual in paper stock.

In the manufacture of folding boxboard and other paper products from waste paper, it is desirable and economical to use papers containing asphalt and/or other contaminants. However, the use of such papers requires special handling, and has caused some paper mills to install expensive equipment.

Previously, it was customary to use dispersing agents, solvents in liquid form, or very high temperatures to disperse bituminous contaminants. Bituminous contaminants, such as asphalt, as well as wax, oil, plastic and certain inks and pressure sensitive adhesives, among others, will respond to such treatment. If high attrition is used, such contaminants are dispersed in the mass of paper fiber so they will not appear as an objectionable spot in the final product.

It is an object of the present invention to provide a novel process for dispersing these contaminants which is not only more economical to operate than the previously known and used processes, but requires a considerably lower initial cost for equipment.

It is a further object of the present invention to provide novel equipment or apparatus in which to carry out the novel process of this invention.

According to the present invention, it has been discovered that waste paper or paper stock containing bituminous contaminants such as asphalt and/or other contaminating materials such as wax, oil, plastics and certain inks, and pressure sensitive adhesives, can be dispersed and the contaminant content in said paper thereby rendered ineffectual. This is accomplished by squeezing the pulped paper to at least 12% solids content or preferably to 35-50% solids content; exposing the paper pulp in this partially dried state in a chamber to heat and to the vapor of a solvent which is suitable for that particular contaminant; the process being conducted at a temperature sufficiently high to soften the contaminant and to increase the chemical action of the solvent vapor; thereby dispersing the contaminants in the paper stock as microscopic particles.

Asphalt is completely soluble in aromatic hydrocarbons such as xylene, toluene, heavy aromatic naphtha and Solvesso 100 and 150 manufactured by Humble Oil and Refining Company and which comprise aromatics of 9 and 10 carbon atoms plus a small percentage of indans, and toluene xylene, some heavier aromatics and indans, respectively. However, because of the insolubility of the asphaltene fraction (contained in the asphalt) in low boiling saturated hydrocarbons, only partial solubility of the total asphalt particle occurs in such aliphatics as heptane, Varsol I manufactured by Humble Oil and Refining Company, and Sovasols, manufactured by Mobil Oil Company. Varsol I is a combination of aromatics, olefins and saturated hydrocarbons, and Sovasols is a combination of 8–12 carbon atom aromatics and 8–14 carbon atom aliphatics. The above solvents and Esso's Laktone, VM&P Naphtha and Isopars and aromatic solvents are also used in the case where the contaminants are wax or soluble inks. Esso's Laktone comprises 21.5% aromatics; 0.2% olefins; 60.3% naphthenes and 18.0% paraffins. VM&P Naphtha comprises 8.9% aromatics; 0.2% olefins; 44.7% naphthenes and 46.2% paraffins. For oil and plastic contaminants the above solvents can be used besides the usual ones such as esters, ketones, etc. For the pressure sensitive adhesives, chlorinated hydrocarbons, ketones and esters can be used as solvents.

Also, according to the present invention it has been found particularly efficient to introduce the solvent in very small concentrations such as one-half gallon of solvent per ton of paper stock. The solvent is preferably introduced into a steam jet so that the steam and the solvent (which is partially vaporized), are introduced into the chamber simultaneously. About 500 lbs. of steam are used per ton of stock.

Also, according to the present invention, the process is conducted at a temperature sufficiently high, about 120° to 250° F. to soften the contaminant and to increase the chemical action of the solvent vapor. In the case of asphalt, 200°–225° F. is sufficient. Paraffin waxes and certain oils will disperse at lower temperatures, from approximately 140–180° F.

Also, according to the present invention there is a novel apparatus or equipment in which to carry out the process of this invention. The apparatus, for use in the treatment of materials such as waste paper, with gases and vapors, in one embodiment, comprises in combination a cylindrical vessel, entry and exit ports for the material to be treated, said entry and exit ports being respectively at opposed ends of the vessel, a shaft mounted along the longitudinal axis of said vessel, a first screw flight extending along said shaft from the entry of the vessel, a second middle screw flight extending along said shaft and separated by a gap in the flight from said first screw flight, a third screw flight extending along said shaft to the exit of said vessel and separated from second middle screw flight by a gap in the flight and at least one fluid entry port along the vessel in the section corresponding to the middle flight portion.

Schematic views of the apparatus used are shown in the accompanying drawings. Many variations, all within the scope of the present invention, can be used.

Figure 2:
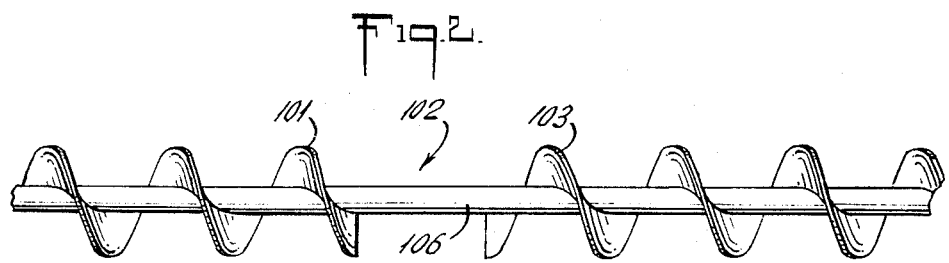
Figure 4:
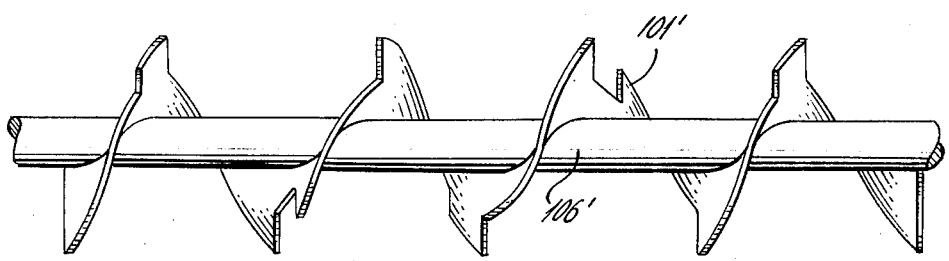
Figure 5:
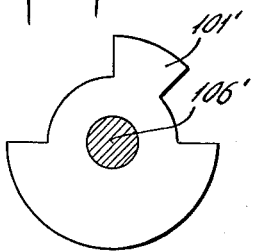

FIG. 1 is a partial cross-section of the apparatus;
FIG. 2 is a side view of the conveyor screw;
FIG. 3 is a cross-section of another embodiment of the apparatus;
FIG. 4 is a side view of the conveyor screw with cut flights; and
FIG. 5 is a cross-section of the first flight taken along 5—5 of FIG. 4.

The apparatus comprises in one embodiment a cylindrical vessel 108, into which partially dried paper stock is introduced at an entry port 100. From there it is conveyed along the interior of the vessel by screw flights mounted upon a common shaft 106 driven by a motor 107. The first screw flight 101 is separated by a gap 102 from an intermediate screw flight 103 and a similar gap 102′ separates that screw flight from a third and, in this embodiment, last screw flight 104. There is also at least one fluid entry port 109 along the vessel in the section corresponding to the middle flight portion. Preferably there are several such ports. At each of the "gaps" a plug of stock itself (not shown) is formed which acts as a seal to prevent the loss of steam and solvent vapor to which the paper stock is subjected in the middle portion of the flights. Thus the plugs serve to make the middle portion a sealed vessel while the steam and vapor are acting on the mass of paper stock and this also eliminates the need for costly pressure vessels and complicated valving arrangements at the entry port 100 and at an outlet port 105 of the vessel. As more paper stock is introduced and the screw flights rotate, the old plugs become dislocated from the gaps and are pushed on with the mass of the treated paper stock until it finally reaches the exit port at the end of the cylindrical vessel. The process is carried out continuously so that new plugs of paper stock are formed with sufficient build-up of paper stock in the middle portion of the cylindrical vessel.

In another embodiment shown in FIG. 3, there are two conveyors, an upper conveyor 108a, and a lower conveyor 108b joined by a down leg 110. The partially dried paper stock at approximately 30–40% consistency, is introduced at an entry port 100a at the end of the upper conveyor 108a opposite the end to which the down leg 110 is attached. A plug (not shown) is formed just beyond a perforated section, 111, by omitting one section of flight to form gap 102a. Steam and solvent are added in the cut and folded section 109a, which permits thorough mixing and heating of the mass. At the end of the top conveyor 108a the stock drops into the down leg 110, in which a level is maintained by varying the speed of the bottom conveyor 108b. In the bottom conveyor 108b the cut flights 101′ on shaft 106′ permit more thorough mixing and attrition in order to dispense the contaminants. The stock is discharged from the lower left end of the bottom conveyor through an outlet port 105a. Restricting gates 112, are mounted on the outlet port 105a and said gates are controlled by air loaded cylinders. This builds up a tighter plug in order to retain the solvent and steam in the system in addition to providing more attrition for dispersion. A more detailed explanation of the gates is given in the applicant's co-pending application Ser. No. 521,272, filed Jan. 18, 1966.

The following examples are intended to illustrate the present invention. These examples are inserted without any view of limiting the invention.

EXAMPLE I

Paper stock slurry containing ¼% asphalt based on the dry fiber weight was thickened to 38% fiber content and fed into the aforementioned apparatus. The temperature of the paper stock at the entry port was 80° F. Varsol I, at the rate of 1 gal./ton of dry paper stock, was injected into a steam supply line which in turn was connected to the mixing chamber of the aforementioned apparatus. The steam pressure was 15 lbs./sq. in. gauge reading. The temperature of the paper stock at the exit port of the apparatus was 230° F. Handsheets made from the paper stock containing the ¼% asphalt before treatment showed numerous asphalt particles, some as large as ⅛″ in diameter and exhibiting an oily, tacky nature that would bleed and smear. Handsheets made from the same paper stock mixture after being subjected to the aforementioned treatment were free of visible asphalt particles. Microscopic examination showed that the asphalt particles were completely and evenly dispersed. In this form they would not be harmful in the finished sheet.

EXAMPLE II

Paper stock containing ¼% of a paraffin wax based on the dry fiber was thickened to 30% dryness and fed into the previously described apparatus. ESSO VM&P Naphtha was injected at the rate of .5 gal./ton of paper stock into a steam line which in turn was connected to the mixing chamber of the aforementioned apparatus. The temperature of the paper stock was increased from 80° F. at the inlet to 150° F. at the outlet. Handsheets made from the treated stock were free of wax agglomerates that had been present in the untreated stock.

EXAMPLE III

Paper stock printed with non-saponifiable based inks and, therefore, non-deinkable in the caustic cook generally used for deinking, was thickened to 35% fiber content and fed into the aforementioned apparatus. The temperature of the paper stock at the entry port was 91° F. Toluene at the rate of two (2) gal./ton was injected into the steam supply line which was connected to the mixing chamber of the aforementioned apparatus. The steam pressure was four (4) lbs./sq. in. gauge reading. The temperature at the exit port of the apparatus was 216° F.

Handsheets made from the paper stock before treatment showed numerous ink specks—those made from paper stock after the aforementioned treatment were uniform in appearance; i.e., they no longer showed the numerous, isolated ink specks.

What I claim is:

1. A process for dispersing contaminants in paper stock comprising the step of pressing a wet pulp paper mass to a solids content of at least 12% and exposing said moisture-reduced mass to vapors of at least one organic solvent for said contaminant at 120 to 250° F., the solvent being employed in a proportion relative to the weight of the pulp calculated on a dry basis of about 0.5 to about 2 gallons per ton, whereby the contaminants are softened and dispersed.

2. A process as claimed in claim 1, wherein the solids content is 35–50%.

3. A process according to claim 1, in which the contaminants comprise asphalt.

4. A process according to claim 1, in which the contaminants comprise wax.

5. A process according to claim 1, in which the contaminants comprise ink.

References Cited

UNITED STATES PATENTS

| | | | |
|---|---|---|---|
| 119,186 | 9/1871 | Simonin | 162—5 |
| 3,057,769 | 10/1962 | Sandberg | 162—4 |

HOWARD R. CAINE, Primary Examiner

U.S. Cl. X.R.

162—63, 69